No. 813,891. PATENTED FEB. 27, 1906.
A. T. HERRICK.
LEAK STOP.
APPLICATION FILED MAY 2, 1905.
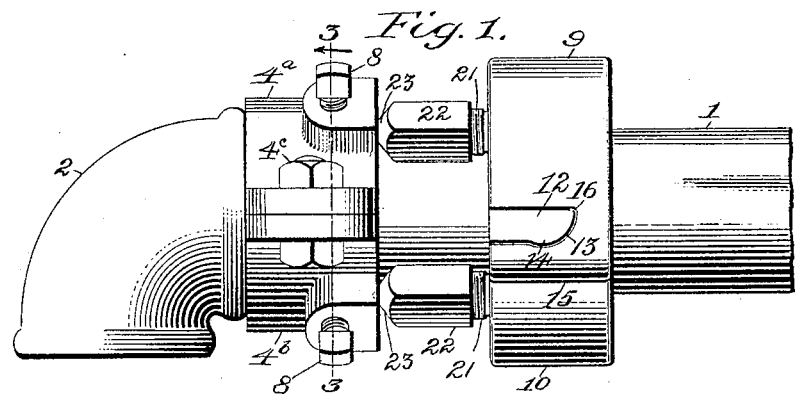
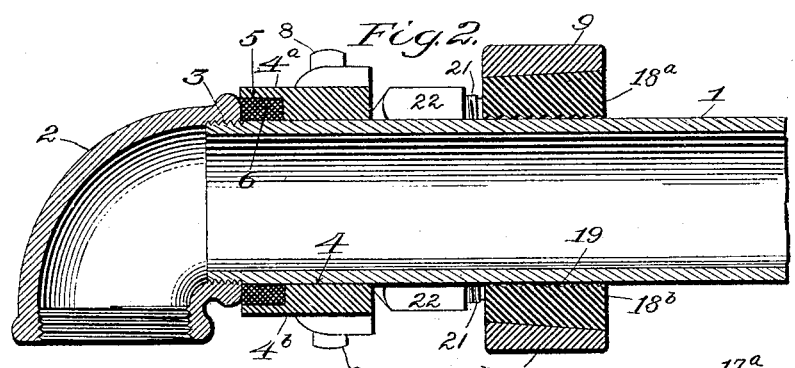
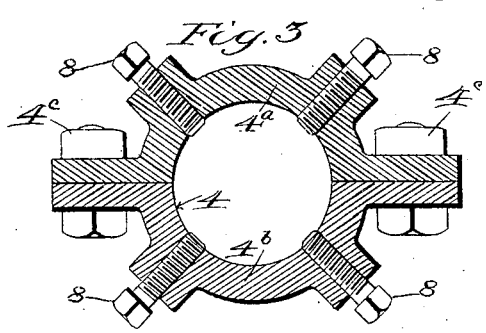
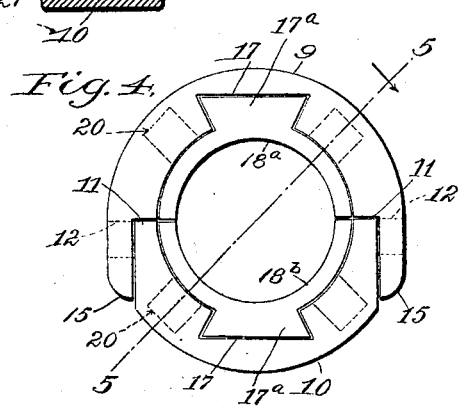
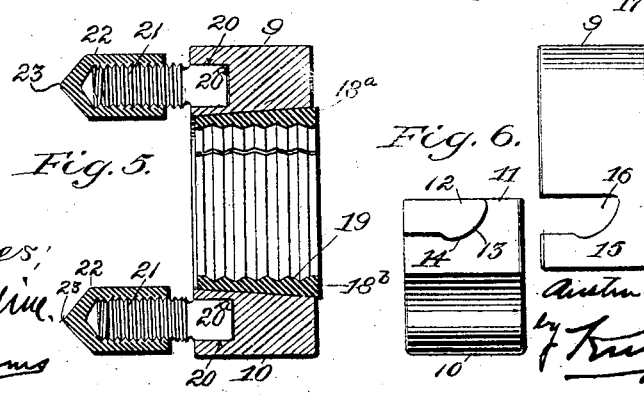
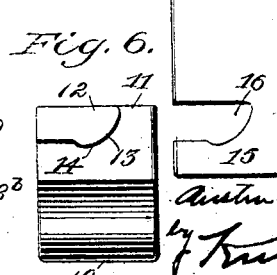

UNITED STATES PATENT OFFICE.

AUSTIN T. HERRICK, OF BRADFORD, PENNSYLVANIA.

LEAK-STOP.

No. 813,891.      Specification of Letters Patent.      Patented Feb. 27, 1906.

Application filed May 2, 1905. Serial No. 258,528.

*To all whom it may concern:*

Be it known that I, AUSTIN T. HERRICK, a citizen of the United States, residing in the city of Bradford, county of McKean, and State of Pennsylvania, have invented certain new and useful Improvements in Leak-Stops, of which the following is a specification.

My invention relates to leak-stops; and it has for an object to provide an abutment-collar that is adapted for connection with different-sized pipes and that will automatically clamp the pipe when the pressure devices are operated.

Other and further objects will appear in the following description and will be particularly pointed out in the claims.

In the drawings, Figure 1 is a side elevation of the preferred embodiment of my invention applied. Fig. 2 is a sectional view of Fig. 1. Fig. 3 is a section on line 3 3, Fig. 1, through the packing-collar. Fig. 4 is an end view of the abutment-collar. Fig. 5 is a section on the line 5 5, Fig. 4. Fig. 6 is a side elevation of the abutment-collar separated.

Referring more particularly to the drawings, 1 indicates a pipe, 2 an elbow, and 3 the joint. The pipe is surrounded by packing-collar, which is divided into two sections $4^a$ $4^b$, secured together by bolts and nuts $4^c$, bore 4 approximately having the same diameter as the outer circumference of the pipe. An enlarged bore 5 is provided for a packing 6, which at its inner circumference is in alinement with the small bore of the collar. Through that portion of the collar that is provided with a small bore extends radial set-screws 8, by which the collar is clamped to the pipe after it has been forced to a proper position. The inner bore of the packing and the small bore of the collar being in alinement with one another make it possible for the collar to engage the pipe throughout its length, and thereby prevent any movement of the collar on the pipe. The abutment-collar is also divided into two approximately semicircular sections 9 and 10, one of which is cut away at 11 on the side near each end, and each cut-away portion is provided with an elongated lug 12, which is positioned near one edge of the collar. This lug has its inner end rounded on one side, as at 13, and has a projection or enlargement 14, forming a continuation of the rounded portion. The other member or section of the collar has two end extensions 15, which are provided with lateral recesses 16, having contracted mouths.

When the two sections of the collar are fitted together, the extensions 15 on member 9 project into the cut-away portions 11 on member 10 and the lugs 12 fit into recesses 16. The sections are fitted together by a lateral sliding movement, and the contracted mouths of recesses 16 expand, due to the rounded end of the lugs, to permit the entrance of the enlargements 14 into rear of the recesses, in which position they are prevented from separating under a slight jar, but upon a blow with a hammer or otherwise they will come apart.

The abutment-collar is provided with a tapering bore and with a pair of inclined dovetailed grooves 17, in which work dovetailed extensions $17^a$ on each member of a divided or sectional slip $18^a$ $18^b$. The members of the slip are by means of their dovetailed connection with the abutment-collar held to the sections of the collar when the collar is removed from the pipe. This slip has a serrated bore 19 and a tapering outer circumference, and when the packing-collar is forced away from the abutment-collar by a means hereinafter described the abutment-collar will move slightly and the serrations of the slip will be forced into the pipe to anchor the abutment-collar.

The abutment-collar is provided on one side with a series of non-circular pockets 20, in which fit the non-circular heads $20^a$ of screws 21. These screws carry turning-nuts 22, having pointed ends 23 to reduce friction. The screws and the turning-nuts form pressure devices having detachable connections with the abutment-collar.

It will thus be seen that I provide a packing-collar carrying its own securing means which hold it against any movement and that the abutment-collar may be removed and employed on different-sized pipes.

I desire it to be understood that within the scope of the appended claims I may make various changes without departing from the spirit of my invention.

Having thus described my invention, what I claim, and desire to secure by Letters Patent, is—

1. The combination with an abutment-collar having a tapering bore, of a slip having a tapering outer face, a packing-collar carrying a packing-ring, and means causing a separation of the abutment-collar and the packing-collar to cause the slip to engage the pipes and the packing-ring to engage the joint to be packed.

2. The combination of a divided abutment-collar and a divided slip fitting within the bore of the collar.

3. The combination of a divided abutment-collar having a tapering bore, and a divided slip having a tapering outer face fitting within the bore of the collar.

4. The combination with a sectional abutment-collar, of a sectional slip fitting within the bore of the same, and means for securing a section of the slip to a section of the collar.

5. The combination with a sectional abutment-collar, of a sectional slip fitting within the bore of the same, and a dovetail connection between a section of the slip and a section of the collar.

6. The combination of a sectional abutment-collar having a tapering bore, a sectional slip having a tapering outer circumference and fitting within the bore of the collar, and means for securing a section of the slip to a section of the collar.

7. The combination of a divided abutment-collar having a tapering bore, and a divided slip fitting within the bore of the collar and having a tapering outer face and serrations on the interior.

8. The combination of the abutment-collar divided into sections and provided with non-circular pockets on one face thereof, and pressure devices comprising screws having non-circular heads adapted to be fitted in the pockets and turning-nuts having pointed ends.

9. The combination with the abutment-collar divided into two approximately semi-circular sections, one of the sections having a lug on each side and the other section having a recess on each side to engage the lug and hold the sections together, of a tapering slip fitting the bore of the abutment-collar.

10. The combination with an abutment-collar divided into sections, of removable slip-sections carried by the sections of the collar.

11. The combination of a sectional abutment-collar having a tapering bore, means securing the sections together and permitting a separation of the sections by a relative lateral movement of the sections, and a slip having a tapering outer circumference, fitted within the abutment-collar.

AUSTIN T. HERRICK.

In presence of—
J. Q. FIELD,
I. C. HETH.